Figure 7:
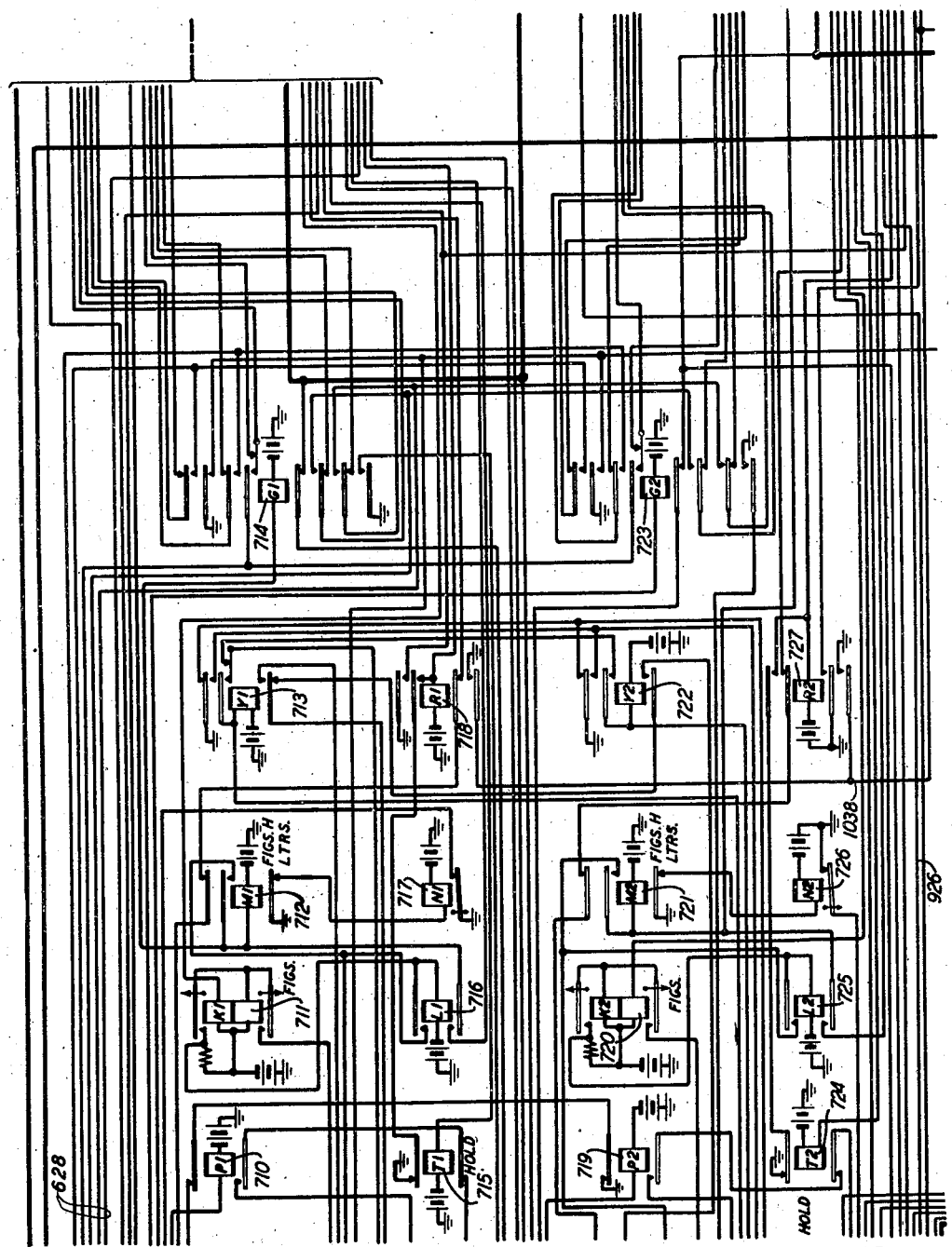

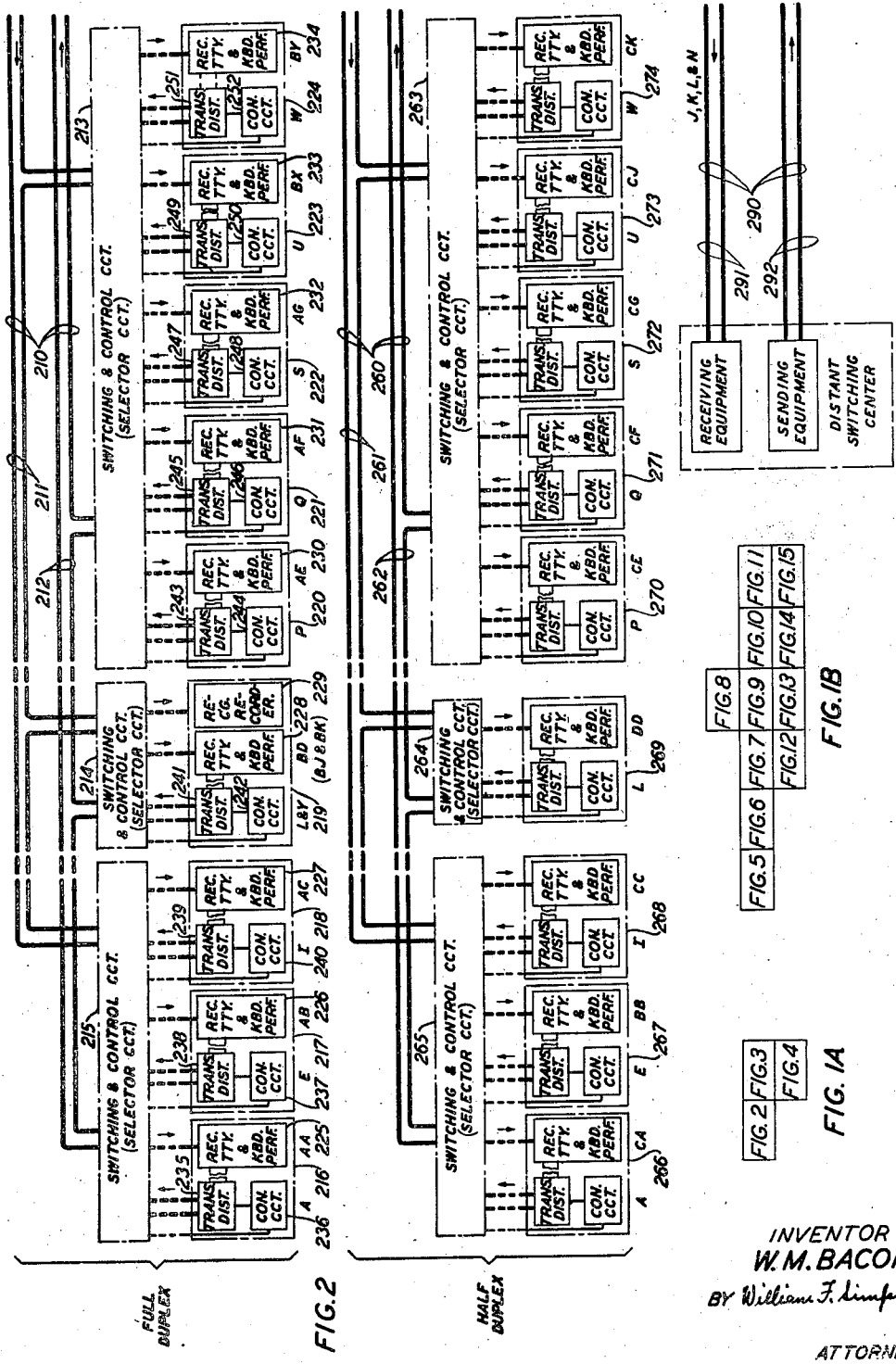

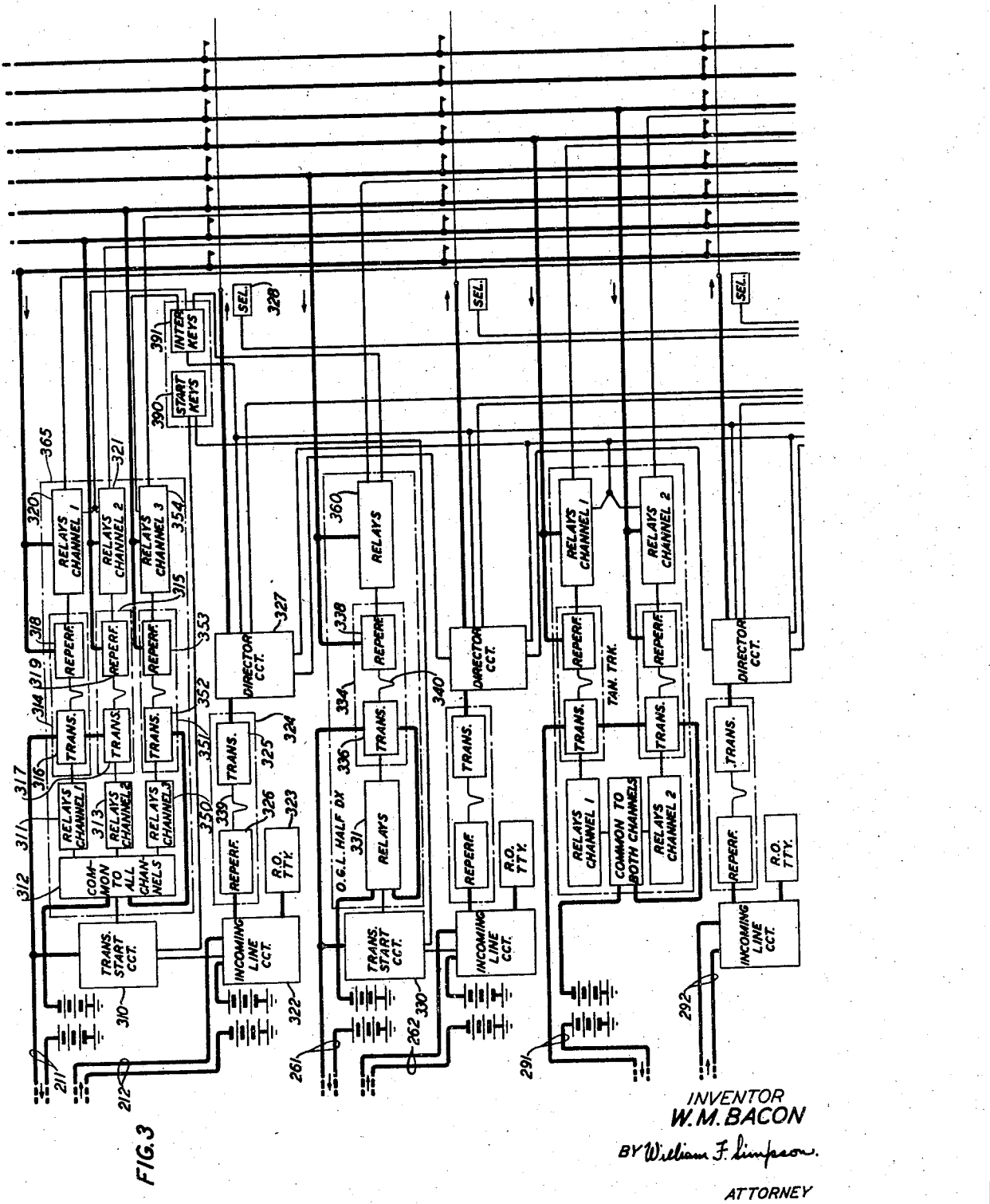

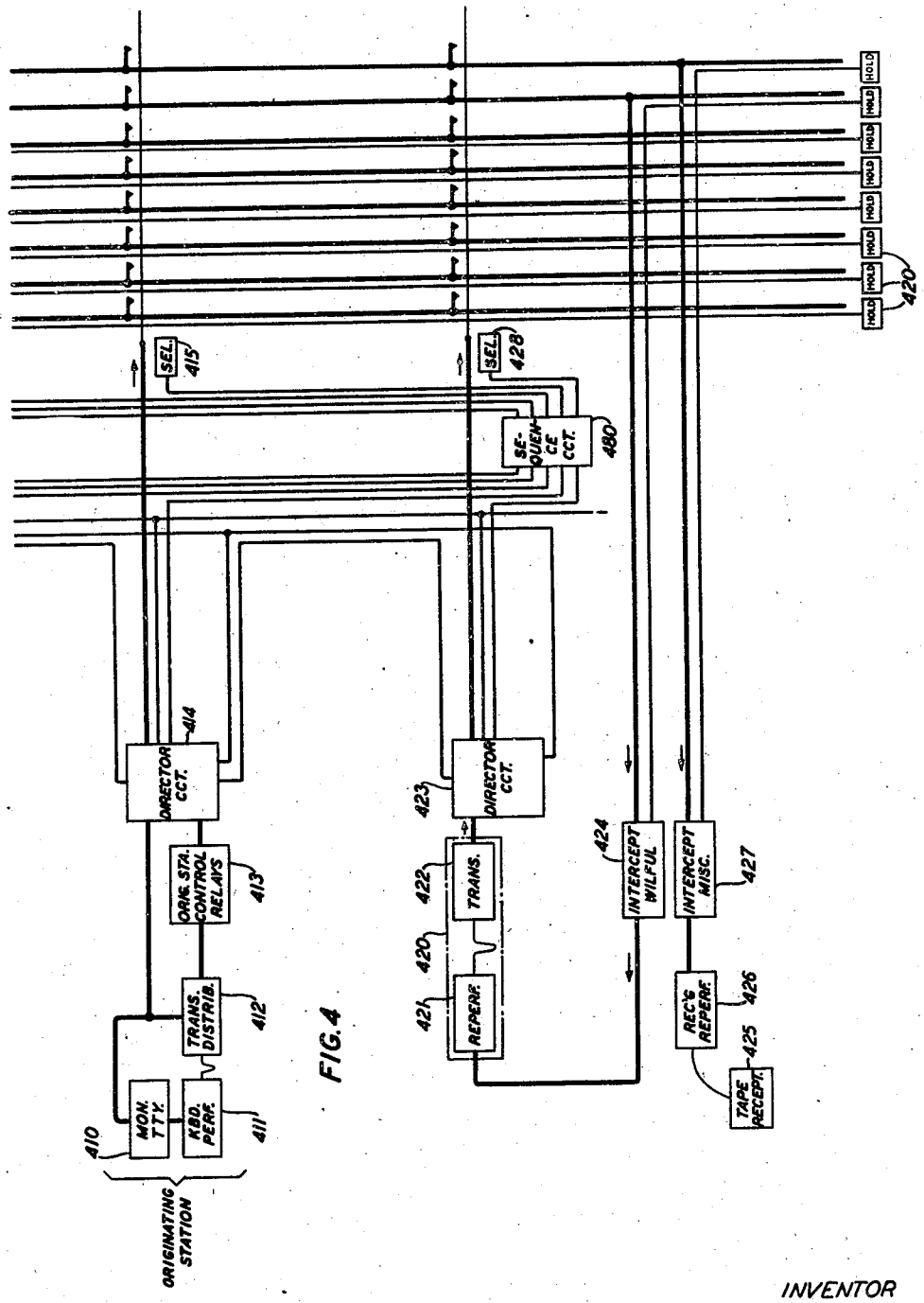

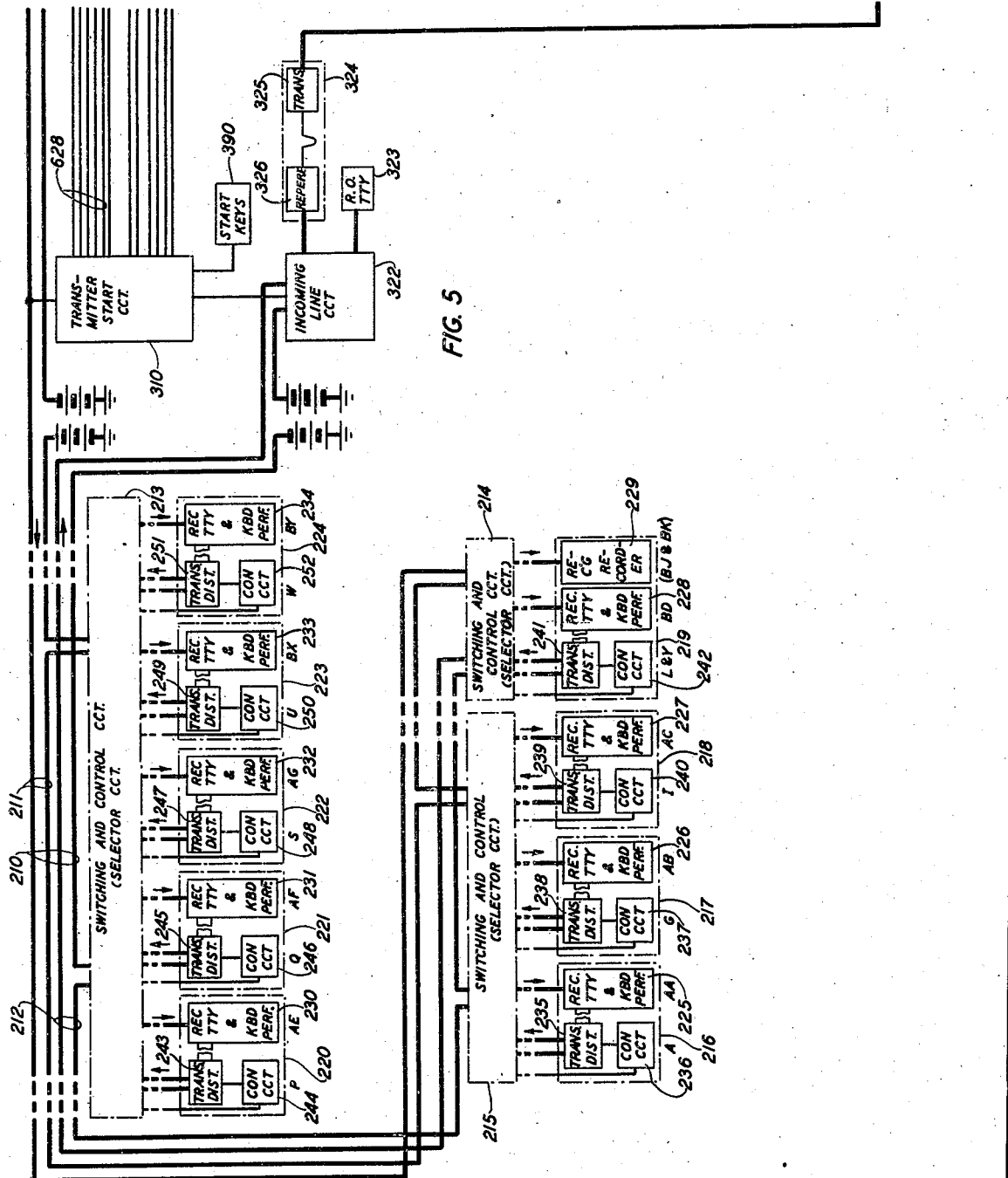

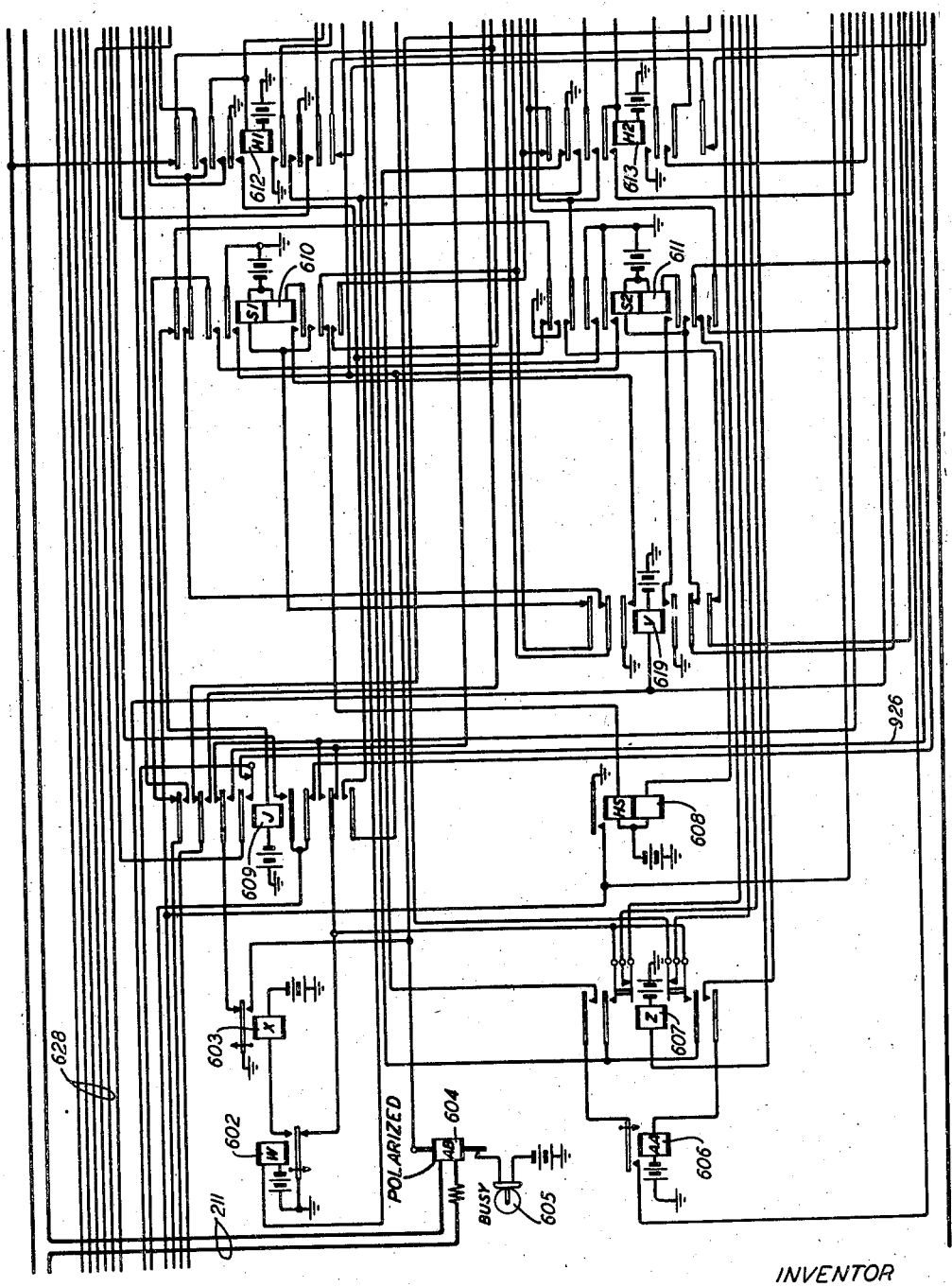

Sept. 3, 1946. W. M. BACON 2,406,787
TELEGRAPH SYSTEM
Filed April 7, 1943 14 Sheets-Sheet 6

INVENTOR
W. M. BACON
By William F. Simpson.
ATTORNEY

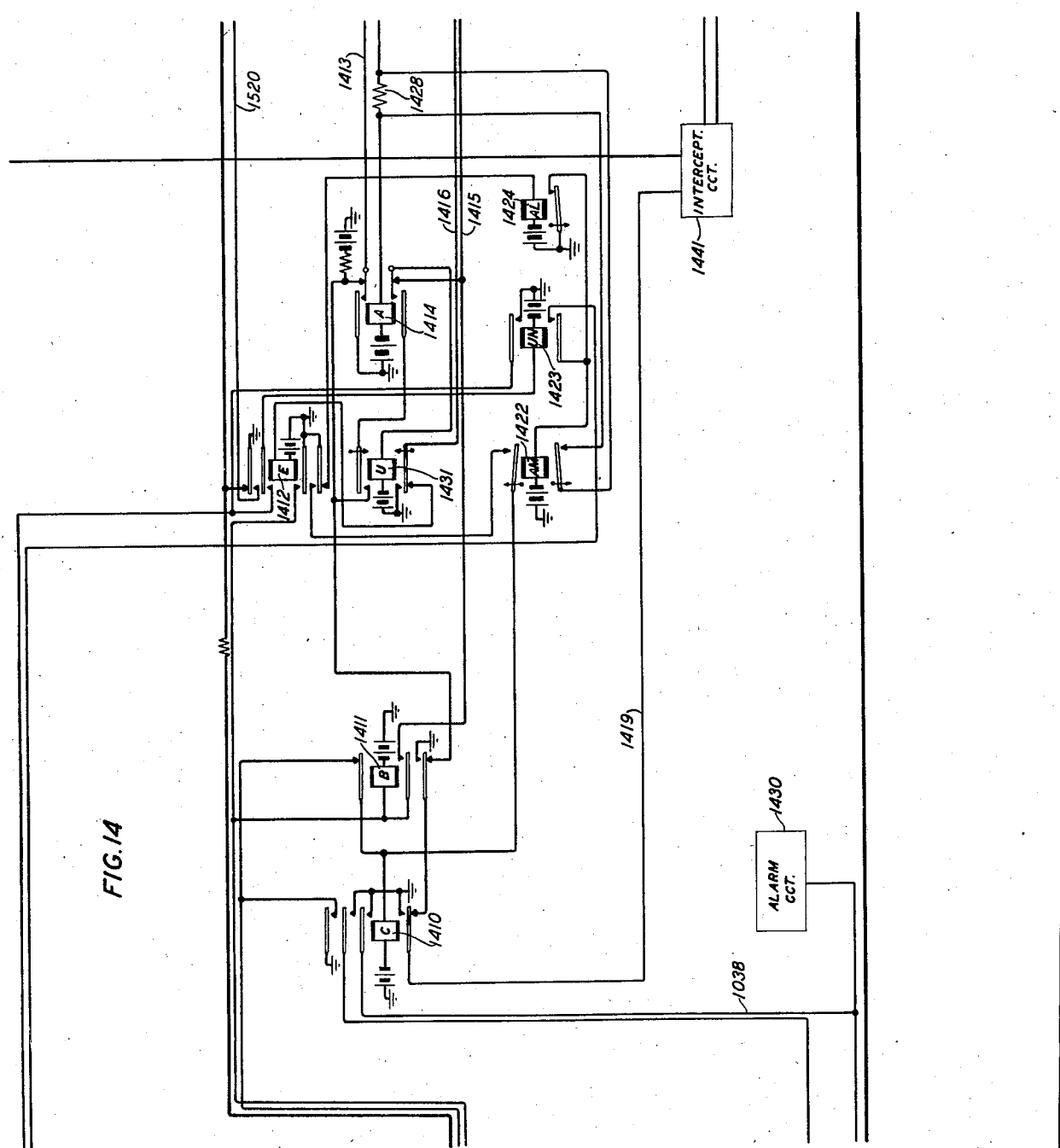

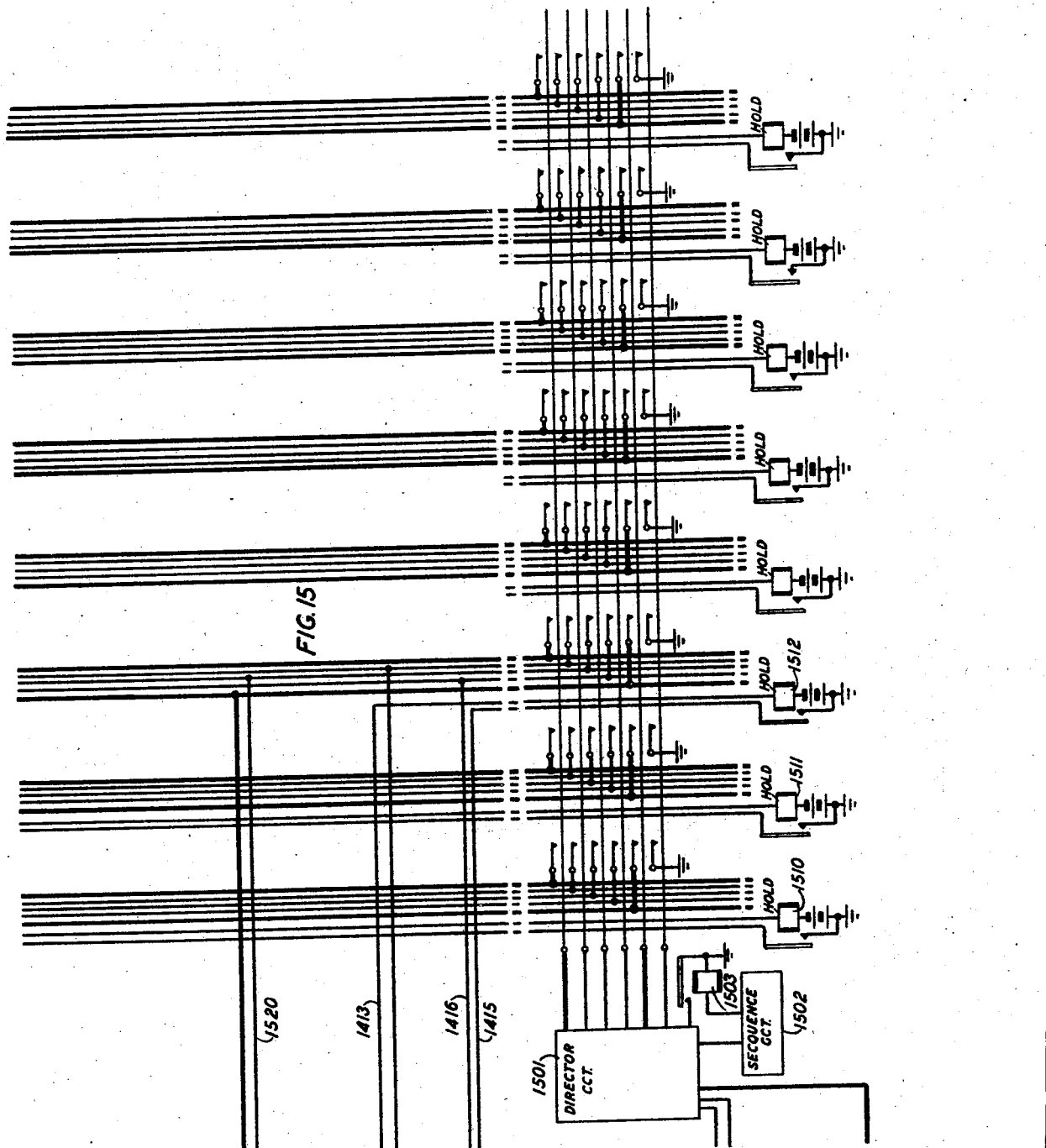

Patented Sept. 3, 1946

2,406,787

UNITED STATES PATENT OFFICE 2,406,787

TELEGRAPH SYSTEM

Walter M. Bacon, New York, N. Y., assignor to Bell Telephone Laboratories, Incorporated, New York, N. Y., a corporation of New York Application April 7, 1943, Serial No. 482,075

8 Claims. (Cl. 178—3)

This invention relates to telegraph systems and more particularly to automatic switching telegraph communication systems.

An object of this invention is to simplify and improve telegraph switching systems to make them capable of more expeditiously and selectively transmitting messages from one station to another under control of directing or address characters preceding the communications between the various stations in which certain messages are transmitted before other messages independently of the stations to which the messages are directed or alternatively messages to different stations of the telegraph system are transmitted before messages to other stations.

Briefly, in accordance with this invention, provision has been made for the transmission of certain telegraph messages through a telegraph system before other messages are transmitted through the system. In one form, certain messages for any station or receiving instrument are given preference over other messages for the same station or stations of the system and are transmitted in preference to these other messages.

Alternatively, in accordance with the present invention, provision is made for providing more rapid service for transmitting messages to predetermined stations of the system than is provided for the transmission of messages to other stations.

In certain telegraph systems it is frequently desirable to insure that certain messages are all transmitted before other messages are transmitted.

Furthermore, in systems in which a plurality of stations are connected to a single channel or party line extending to the switching center, it is sometimes desirable to provide equipment for having certain messages transmitted before other messages are transmitted over the party line.

A feature of the invention comprises an arrangement whereby messages directed to one station upon a multistation channel may receive preference over messages directed to other stations.

In the exemplary embodiment of the invention described herein, the invention has been incorporated in a comprehensive switching system of the type described in the copending application of Branson et al., Serial No. 448,878, filed June 27, 1942. In accordance with systems of that type, a plurality of outlying or way stations are connected to a telegraph transmission channel extending to a central exchange. At the central exchange the messages are stored and selectively directed to storage repeaters for later transmission over the respective transmission circuits extending to the various stations of the system. Two or more groups of storage repeaters are associated with each of the outgoing transmission circuits extending to a station associated with each of the party lines. Messages which are given preference are directed to one group of storage repeaters, while the other messages are directed to another group of storage repeaters. Control equipment is provided in which transmission from the storage repeaters is arranged so that transmission will proceed from the group of storage repeaters to which the preferred messages are directed as long as any messages are stored in any of the group of storage repeaters handling preferred messages. Messages will be transmitted from other groups of storage repeaters handling the other messages only when no preferred messages are awaiting transmission.

Features, principles, combinations and subcombinations comprising the novel features of the invention may be applied in variously modified systems.

The foregoing and other objects and features of this invention, the novel features of which are specifically set forth in the claims appended hereto, may be understood from the following description when read with reference to the attached drawings, in which:

Figs. 1A and 1B show the manner in which the remaining figures of the drawings are positioned adjacent each other to show a specific embodiment of the invention;

Figs. 2, 3 and 4 when arranged as shown in Fig. 1B, show in diagrammatic form the various elements of a typical system incorporating the present invention; and Figs. 5 through 15 inclusive, show in detail circuit arrangements of certain elements of a typical system incorporating the present invention.

Referring now to Figs. 2, 3 and 4 when arranged as shown in Fig. 1A, Fig. 2 shows two typical party lines and the station and control equipment associated therewith. One party line is designated 210 which comprises a receiving channel 211 and a transmitting channel 212. Similarly, party line 260 comprises a receiving channel 261 and a transmitting channel 262. Both transmitting and receiving channels are illustrated in Fig. 2 and also in Fig. 3 by means of telegraph lines or conductors. It is to be understood, however, that these lines or channels may include any type of telegraph transmission equipment normally employed for the transmission of telegraph signaling pulses or code combinations of pulses. These lines or channels may, for example, include open wire lines, cable lines, channels of voice frequency or high frequency carrier current systems, radio systems, time division multiplex systems or telegraph channels of composite telephone and telegraph transmission systems or of any other type of pulse transmission channels including full-duplex and also simplex channels, or systems suitable for the transmission of signaling pulses such as employed in telegraph systems. The various party lines and channels thereof may include or comprise any or all of the foregoing types of transmission systems or any or all combinations of such types of transmission systems.

The transmission systems of the various types comprising the party lines operate in their usual and well understood manner and the operation, therefore, need not be repeated because it would serve no useful purpose and only tend to obscure the other elements and features of the present invention.

Each of the party lines shown in Fig. 2 extends to a plurality of outlying subscriber or way stations. It is to be understood also that it is within the scope of this invention to extend lines individually from one or more of the outlying stations to the central switching exchange. In this case certain of the control equipment associated with each of the party lines need not be provided as will be readily apparent to those skilled in the art.

Each of the lines which extends to more than one outlying station is provided with control equipment located at or near the outlying stations of the party line. Control equipment may be provided which is individual to each of the outlying or way stations in case the way stations are rather widely separated or control equipment may be provided common to a group of outlying stations which are located more closely together. In addition, certain of the control equipment may be individual to certain outlying stations, while other control equipment provided for the same party line may be common to a plurality of the outlying stations.

As shown in Fig. 2, three separate and distinct sets of switching and controlling circuits, sometimes referred to as a secondary switching center, are associated with each of the party lines. For example, party line 210 extends to the switching and control circuits or secondary switching centers 213, 214 and 215. The control equipment 214 is individual to a station at 219. Control equipment 215 is common to stations 216, 217 and 218, while control equipment 213 is common to stations 220 to 224 inclusive. Each of the outlying stations is provided with a receiving instrument, transmitting apparatus and control equipment. In the specific system described herein, the transmitting equipment comprises a keyboard perforator for perforating paper tape in accordance with the signals to be transmitted and a tape controlled transmitter for transmitting signals in accordance with the perforations in the tape. For example, the receiving instrument and the keyboard perforator are illustrated diagrammatically and designated 225 at station 216 of Fig. 2, the transmitting distributor is designated 235, while the control equipment is designated 236. Similar equipment is provided at the other stations. Station 219 is provided with an additional receiving recorder or reperforator for again perforating tape in accordance with messages received from the system. This reperforator is provided at those stations at which other telegraph lines or circuits may terminate so that the messages intended for stations connected to these other lines may be recorded at station 219 and later automatically transmitted over the proper line without requiring the time of an operator to retransmit the message.

In order to transmit messages over this system, the attendant or subscriber at the outlying or way stations perforates messages in paper tapes for later transmission over the system. Preceding each message, an address or group of switching signals is perforated in the tape and following each message an end of message signal is also perforated in the tape. Following the end of message signal, a subscriber may perforate any address signal followed by another message intended for the station designated by the address. As set forth in the above-identified application of Branson et al., the subscriber may insert one or more letters signals at the beginning of the tape, at the end of the tape, between messages and at other desirable or convenient places between the message codes, between certain of the controlling codes, or between these codes and the message codes. Furthermore, the operator or attendant will usually perforate an end of transmission signal in the tape after the disconnect signal following the last message available for transmission.

The attendant or operator at the outlying station will then insert a tape in the transmitter for transmission over the system. At a later time the transmitter is started under the control of an operator or switching circuits at the central switching station. Thereafter the messages are transmitted to the central switching station and recorded thereat.

The circuits at the central switching station are illustrated in Figs. 3 and 4. Fig. 4 shows the originating position at the central switching equipment comprising a keyboard perforator 411, a monitoring instrument 410, a transmitter or transmitting distributor 412, control relays 413 and a director circuit 414. Fig. 4 also shows a miscellaneous intercept circuit 427 which operates with a receiving reperforator 426 and a tape receptacle 425. A wilful intercept circuit 424 is also shown. This intercept circuit is provided with a repeating instrument 420 comprising a recorder or reperforator 421 and a transmitting device 422. A director 423 is also associated with the wilful intercept circuit.

Each of the party lines terminating at the switching office or center is provided with an incoming line circuit 322 and a receiving only machine 323, a storage receiver 326 and associated transmitter 325. The incoming line circuit 322 causes the messages intended for the central switching station to be recorded on the receiving only receiver 323 and causes the messages intended for other stations of the system to be recorded by the reperforator 326. Director circuit 327 is associated with the transmitter 325 and serves to direct messages from the transmitter 325 selectively to any of the lines terminating at the central switching station under control of the address characters preceding each message.

Each of the party lines is also provided with transmitter start circuits, such for example as 310, and outgoing line circuits and equipment 365 for transmitting messages over the party line. The outgoing line circuit associated with party line 210 and particularly the receiving channel 211 thereof, incorporates control circuits and equipment in accordance with the present invention as will be described hereinafter. Briefly, messages directed to stations of party line 210 are transmitted to storage repeaters of the outgoing line circuit associated with line 210 under control of the director circuits of the lines upon which the messages originate for later transmission over the outgoing lines.

Figs. 2 and 3 also show a trunk circuit 290 comprising two transmission channels 291 and 292 extending to a distant switching center 295. The terminal equipment associated with the trunk circuits is similar to the terminal equipment associated with each of the party lines as described above.

The operation of the various circuits referred to above is described in detail in the above-identified copending patent application of Branson et al. Since the respective circuits referred to above forming parts of the system referred to herein operate in substantially the same manner as described above in said patent application of Branson et al., which patent application is made a part hereof as if fully included herein, the detailed description need not be repeated here.

Reference will now be made to Figs. 5 through 15 inclusive, when arranged as shown in Fig. 1B. Fig. 5 shows the subscribers' stations and control equipment associated with party line 210. The subscribers' stations and control equipment associated with party line 210 are shown in substantially the same form as shown in Fig. 2. In addition, the same reference numerals have been employed to designate the stations and equipment. Details of typical party lines of this type are described in the above copending application of Branson et al. and also in a patent application of Krecek et al., Serial No. 408,406, filed August 28, 1941, which applications are hereby made a part of this application as if fully included herein. Inasmuch as the equipment in the circuits at the subscribers' stations as well as the control circuits therefor operates in substantially the same manner as described in the above-identified copending applications, detailed description of the operation of the circuits will not be repeated here.

Fig. 5 also shows transmitter start circuit 310 as well as the incoming line circuit 322, storage repeater 324 comprising a reperforating unit 326, and a transmitting unit 325. Fig. 5 also shows a receiving only machine 323 associated with the incoming line circuit for receiving messages intended for the central switching center. As described above, incoming messages intended for the central switching center are directed to the receiving only machine 323, while messages intended for other stations of the system are recorded by the receiving instrument 326 of the storage instrument 324. The transmitting portion of the storage device 324 cooperates with the director circuit 1501 for selectively directing messages to the proper lines in accordance with the address codes preceding each of the messages. The operation of the director circuit in directing messages to the respective lines of the system under control of switching or directing characters preceding various messages or communications is substantially the same as described in the above-identified application of Branson et al. Consequently, the details of operation of this portion of the system will not be repeated here. It should be noted, however, that a single line is shown in the drawings extending from the transmitter 325 to the director circuit 1501. This single line shown in the drawings is intended to represent the operative connections between transmitter 325 and director 1501 and includes as many wires or conductors as are necessary to control the operation of the system in the manner set forth in the above-identified copending Branson et al. application.

Assume now for purposes of illustration that it is desired to give preference to messages directed to the receiving recorder or reperforator 229 at station 219. As will be readily apparent to those skilled in the art, messages to other receiving devices or other stations may also be given preference over other messages. As indicated in the above-identified copending application of Branson et al., messages directed to the recording equipment 229 at station 219 are preceded by either the address code BJ or BK. Any suitable address code may be chosen to direct messages to this recording equipment, but for the purposes of illustration the code letters BJ and BK were assumed in the above-identified copending application and will be likewise assumed herein.

As pointed out in the above-identified copending application, it is frequently desirable to retransmit messages recorded by the recorder 229 over other telegraph systems. For this reason, it may be desirable to give these messages preference over other messages transmitted over the system described herein. The messages originating at any of the stations of party line 210 or any of the other stations of the system directed to the recording equipment 229 will be transmitted to the central switching station in the same manner as the messages directed to other stations of the system. In transmitting these messages to the central switching station, the attendants at each of the outlying stations will perforate message signals preceded by the address codes in the tape by means of the keyboard perforator at the respective stations. The perforated tape is then inserted in the tape controlled transmitter where it awaits transmission to the central switching station.

Equipment at the central switching station either automatic or under control of the start keys 390, causes the start circuit 310 to transmit predetermined start signals or patterns of signals over the receiving channel 211 of party line 210 and causes the initiation of transmission selectively from the transmitters at the stations connected to the party line.

The messages are then transmitted over the transmitting channel, such as 212, to the central switching station. The central station incoming line circuit together with the storage repeater 324 and receiving only device 323 cause the signals to be recorded either by the receiving only device 323 or in the storage repeater 324 by recording equipment 326 thereof or by both devices 323 and 324. Thereafter the transmitting portion 325 of the storage repeater 324 will, in cooperation with the director circuit 1501, cause the message to be transmitted to circuits associated with the proper party line extending to the stations designated by the address preceding each message or communication.

The operation of the equipment as well as the more detailed description of the equipment are set forth in the above-identified application of Branson et al. Since the equipment of the system described in this application operates in substantially the same manner as described in said application of Branson et al., the description thereof will not be again repeated.

In directing messages to the respective outgoing line circuit, the director equipment 1501 first tests the outgoing line circuit equipment to determine whether or not it is busy. If the outgoing line equipment is busy, the director equipment will wait until it becomes idle. If the equipment is idle or some channel thereof is idle, the director equipment will cause the message to be transmitted over the idle channel.

Figure 8:
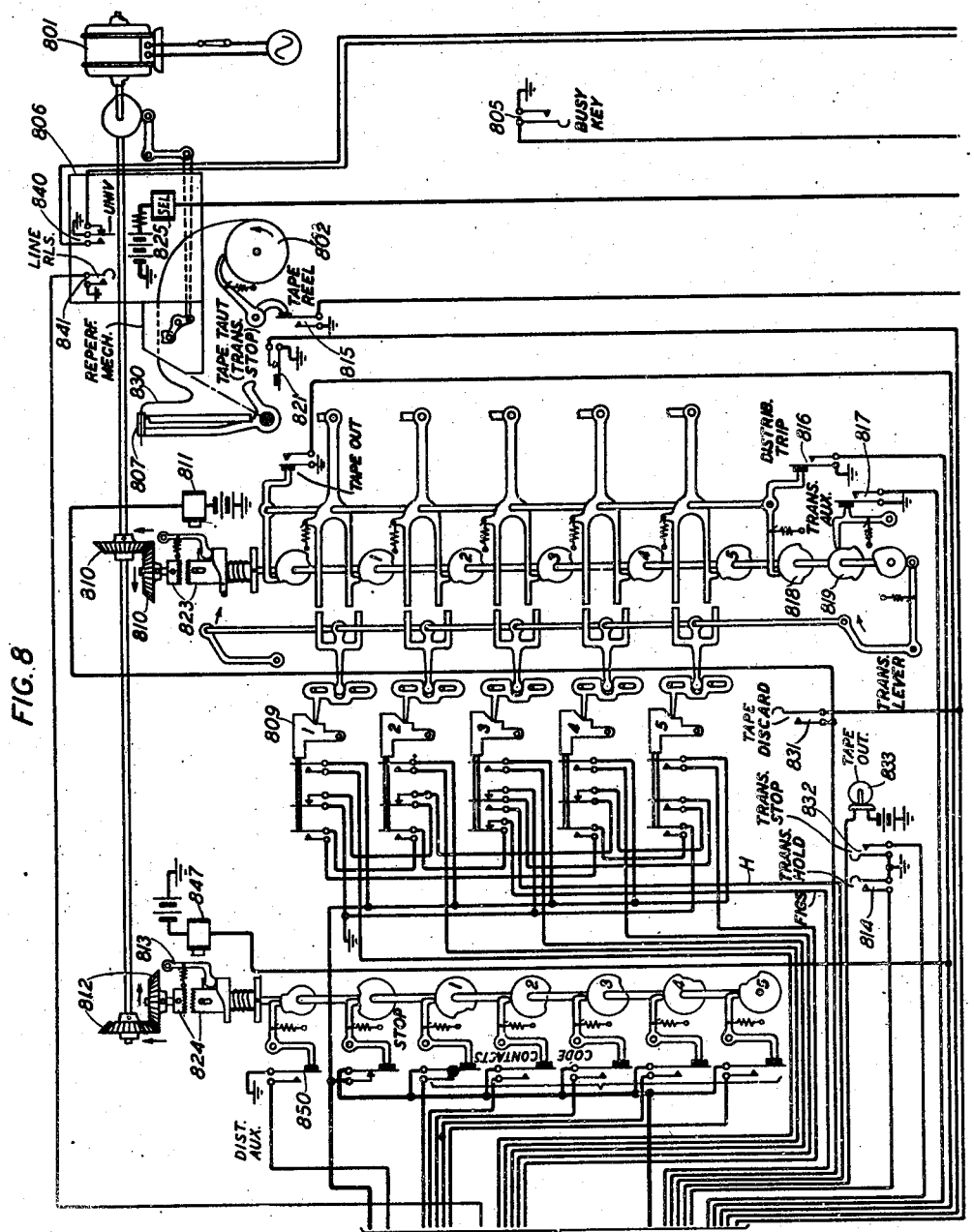
Figure 9:
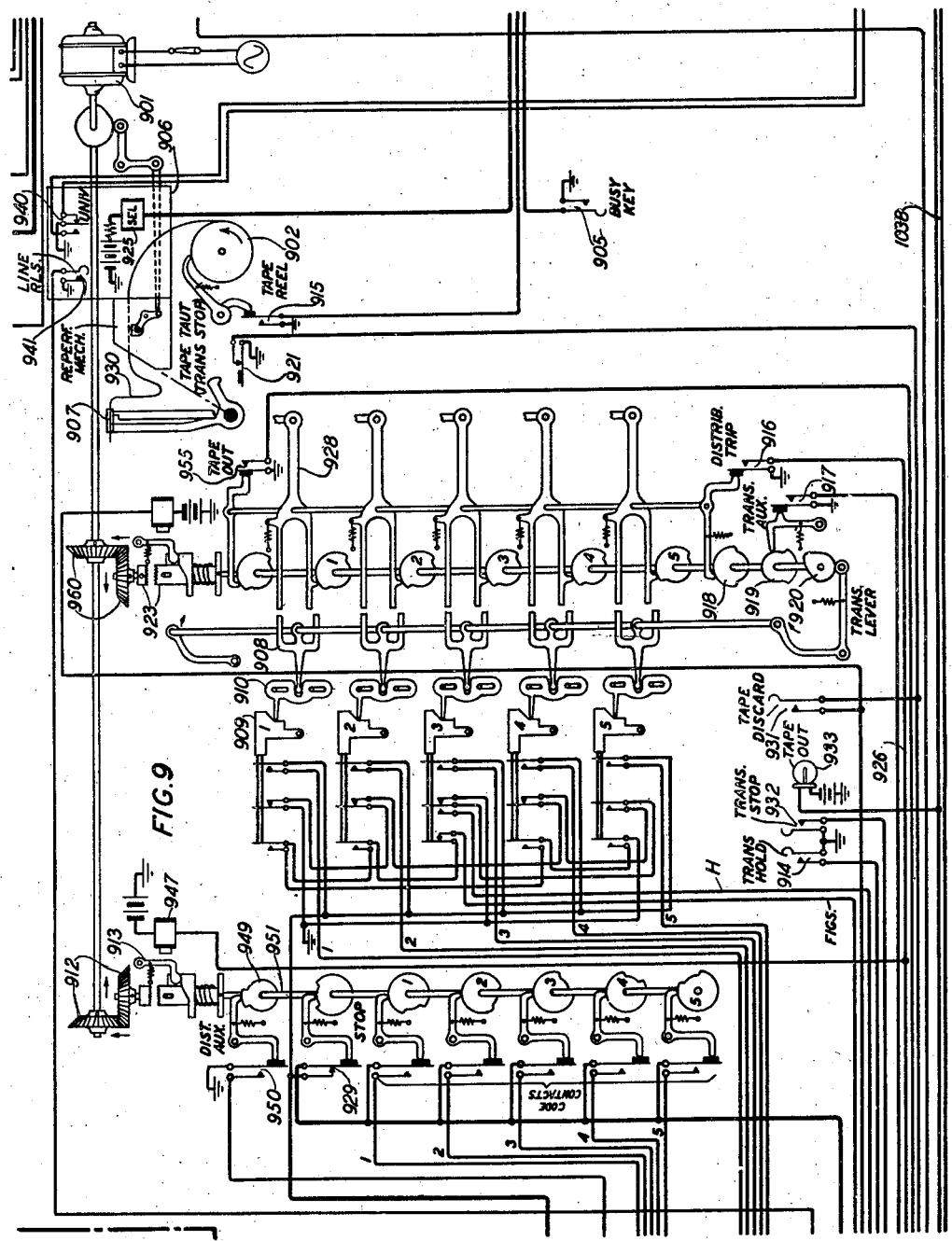
Figure 10:
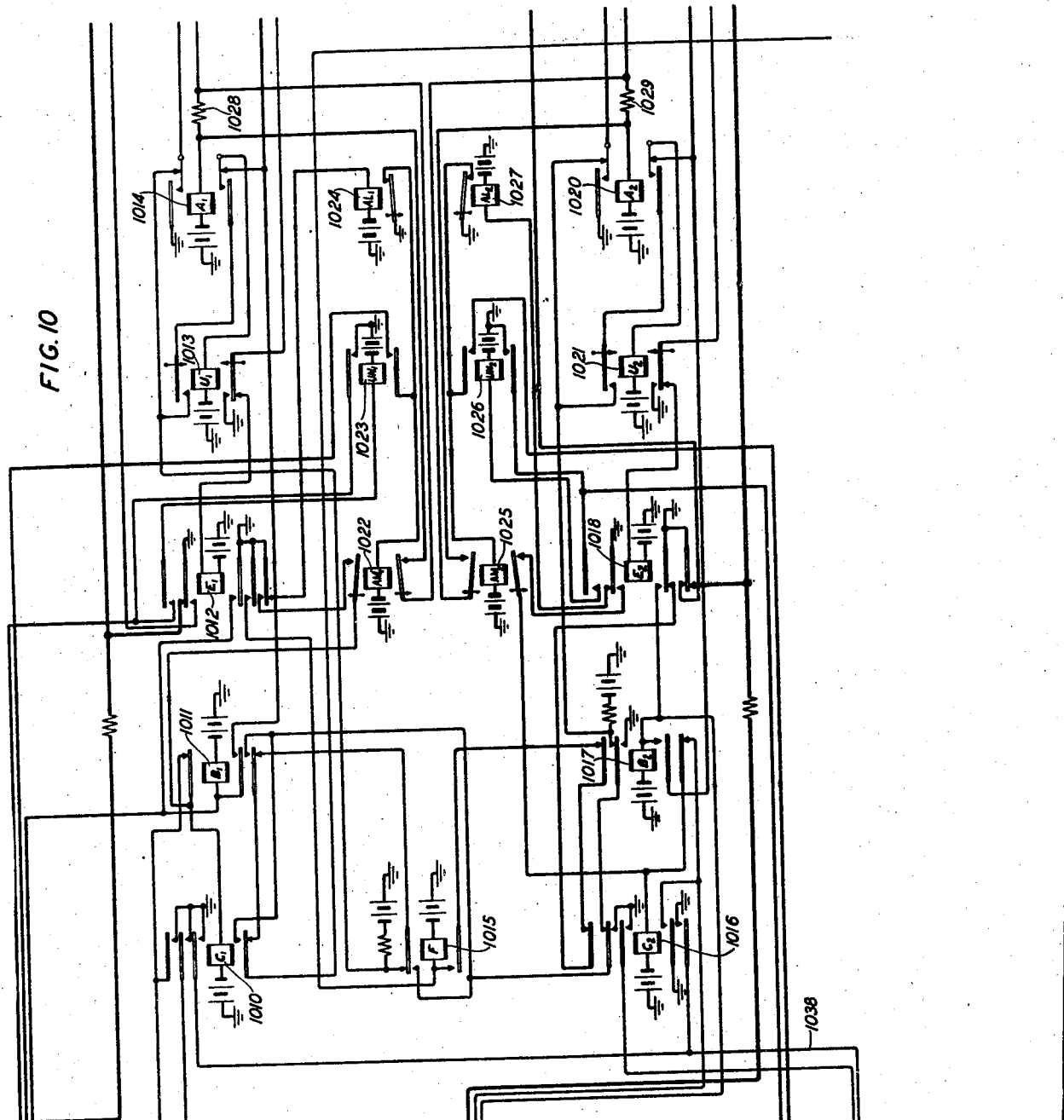
Figure 11:
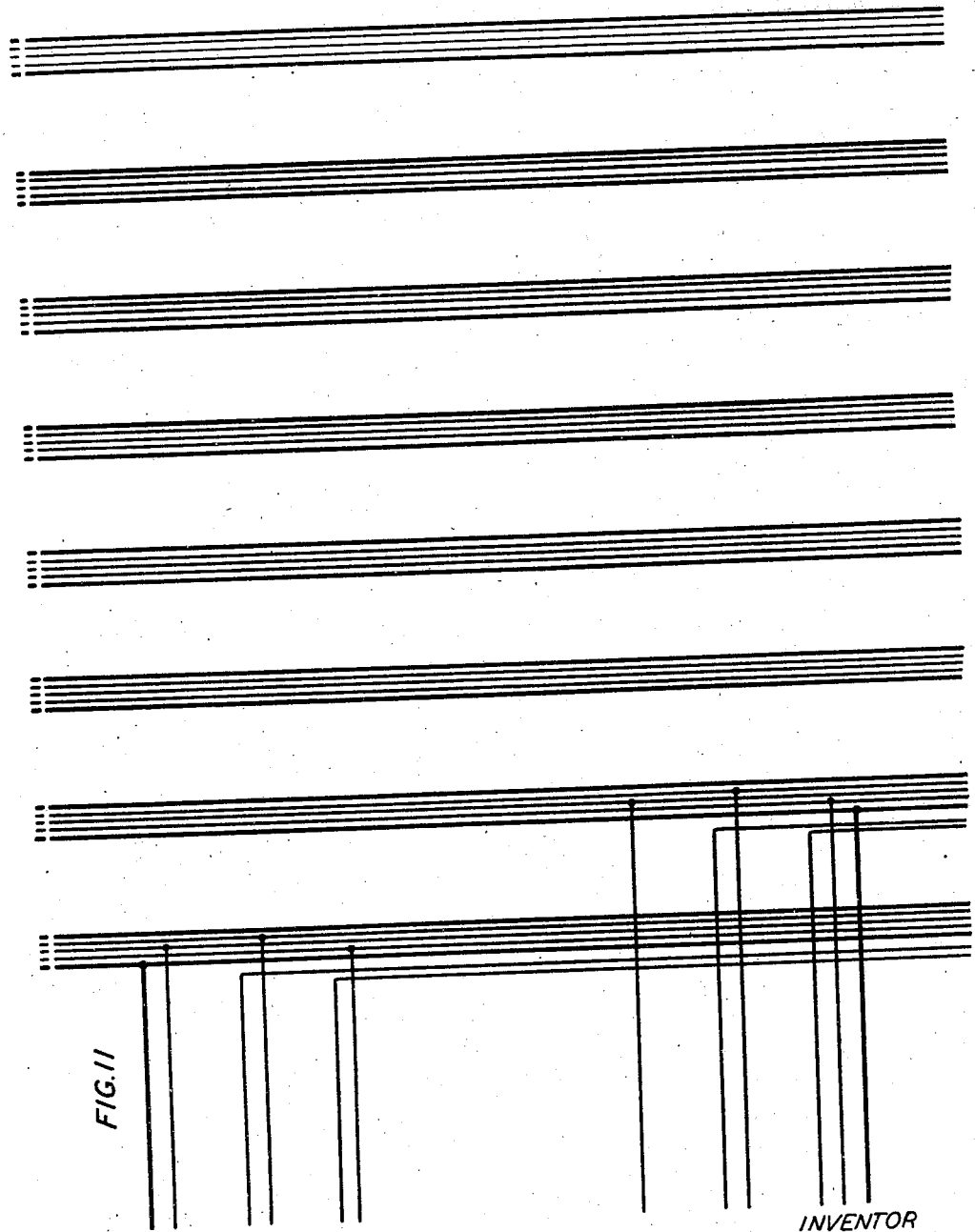
Figure 12:
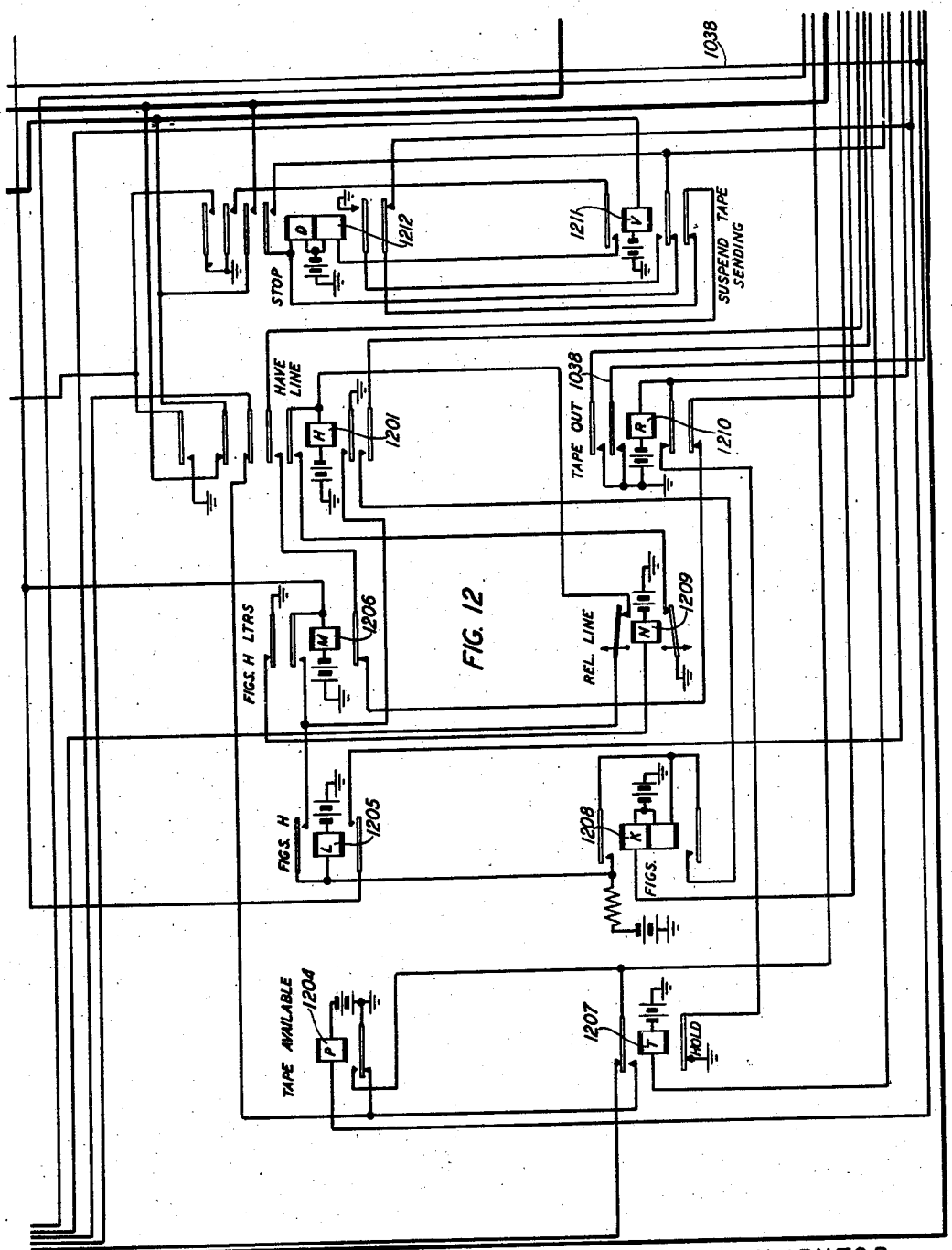
Figure 13:
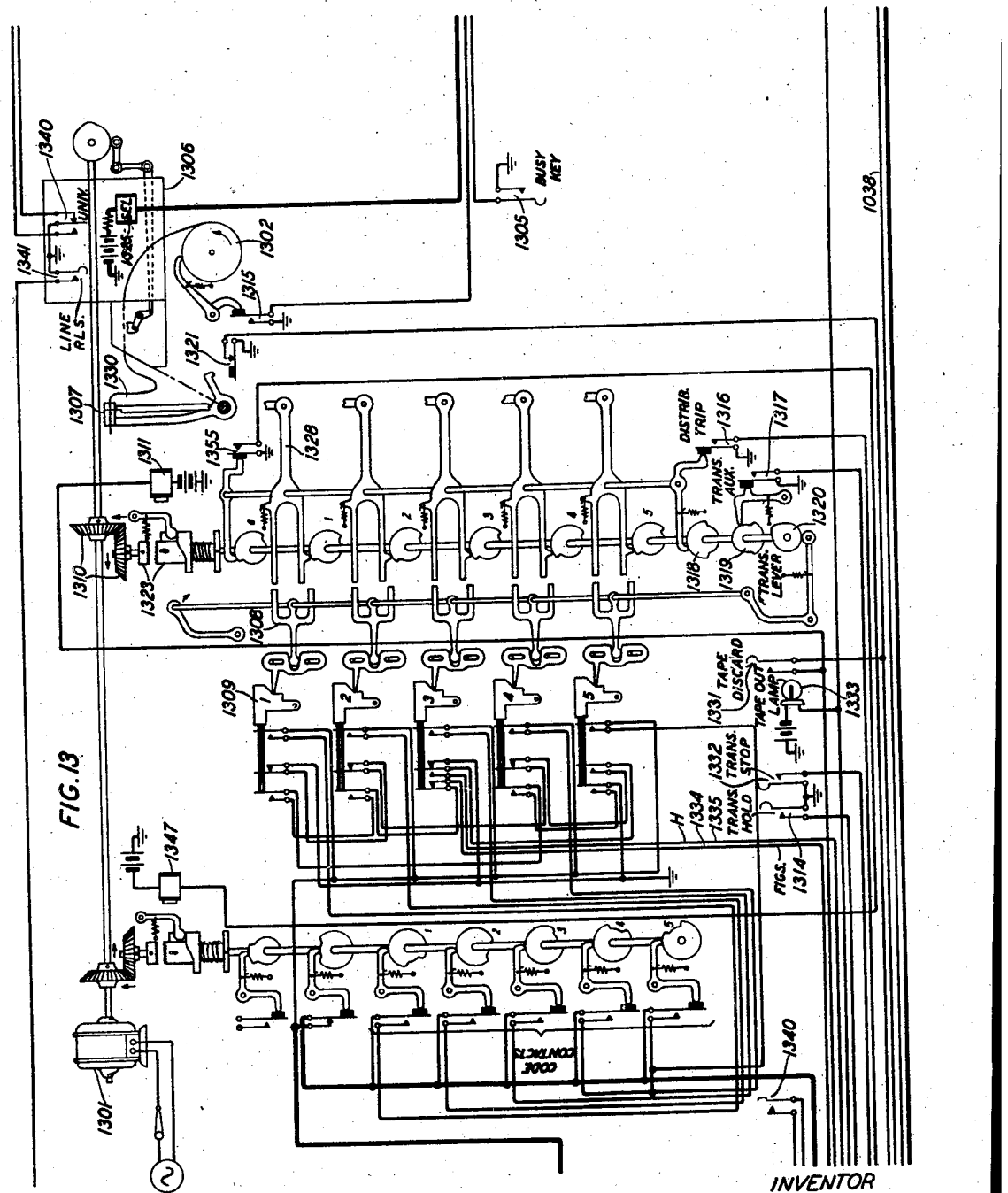

Under the assumed condition, messages preceded by the address codes BJ and BK are given preference over other messages, messages preceded by these address codes will be directed to the storage repeating equipment shown in Fig. 13, whereas, other messages directed to other stations of the party line 210 will be directed to the storage equipment shown in either Fig. 8 or 9.

Consider first the messages directed to the storage repeater equipment shown in Fig. 13. When the messages are preceded by the address codes, either BJ or BK, director equipment 1501 will first test the conductor 1419 extending through the intercept circuit 1441 to determine whether or not the receiving side of the storage repeater shown in Fig. 13 is busy. If this equipment is busy, nothing further will happen until the equipment becomes idle. At this time, the director circuit will cause ground to be connected to lead 1419 which lead extends through the lower break contacts of relays 1410, 1411 and the upper break contacts of relay 1414 over conductor 1413 to the vertical magnet 1512 of the cross bar switch diagrammatically illustrated in Fig. 15. The horizontal magnet 1503 of the cross bar switch was previously operated under control of the sequence circuit 1502 and director circuit 1501 in a manner similar to that described in the above-identified copending application of Branson et al. The operation of the vertical or hold magnet 1512, when magnet 1503 is also operated, causes the contacts at the cross-point to be operated and also completes a circuit over lead 1415 for operating relay 1431 from battery through the winding of relay 1431, the lower break contacts of relay 1414 and lead 1415 to ground through the operated contacts of magnet 1512. A typical cross bar switch of the type shown in the drawings is described in greater detail in United States Patent 2,021,329 granted to Reynolds on November 19, 1935, which patent is hereby made a part of this application as if fully included herein.

Relay 1431 in operating connects ground to lead 1416 extending through the operated cross-point contacts of the cross bar switch to the director circuit 1501. The director circuit then completes a circuit for the operation of relay 1414. Relay 1414 in operating applies ground to lead 1413 for holding magnet 1512 operated. Relay 1414 in operating also transfers the circuit of the winding of relay 1431 to lead 1419 extending to the director circuit. When the director circuit removes ground from lead 1419, relay 1431 releases and prepares a circuit for the operation of relay 1412 from battery through the winding of relay 1412, lower break contacts of relay 1431, over lead 1416 to the director circuit. The director circuit together with the release of relay 1431 will cause relay 1412 to operate and condition the receiving portion of the storage repeater shown in Fig. 13 for operation. In addition, the operation of relay 1412 completes a circuit for the operation of relay 1411. Relay 1411 in turn operates and completes a circuit for maintaining itself operated over lead 1415. Relay 1411 in operating also causes the circuit to test busy should any other director circuit test this circuit preparatory to sending messages thereto.

The operation of relay 1412 connects ground to lead 1520 extending to the director circuit which in turn causes the message preceded by the second of the address codes to be transmitted to and recorded by the recording portion of the storage repeater shown in Fig. 13. Under the assumed condition the message will at this stage of transmission be preceded by either a J or K designating the recording equipment 229 at station 219.

In a similar manner, messages preceded by other of the address codes designating other stations of the party line 210 will be directed to either the storage repeater equipment shown in Fig. 8 or that shown in Fig. 9 in a manner similar to that described above with reference to the directing of a message to the recording equipment shown in Fig. 13.

In addition the messages directed to the other stations of party line 210 will be directed alternatively to the storage repeater shown in Figs. 8 and 9 due to the operation of relay 1015 in the manner described in the above-identified copending application of Branson et al. forming a part of the present application. Various alarm and other indications are provided for indicating the condition of the system as described in the above-identified copending application, which description need not be repeated here.

The storage equipment shown in Figs. 8, 9 and 13 comprises recording instruments 806, 906 and 1306 respectively. These equipments are driven by their respective motors 801, 901 and 1301 and record messages under control of the respective selector magnets 825, 925 and 1325 and cause the messages to be both printed upon and perforated or punched in respective tapes 830, 930 and 1330. When message material is stored by these receiving devices or storage devices, it will cause the respective transmitting heads 807, 907 and 1307 to rotate in a counter-clockwise direction and thus cause the respective contacts 821, 921 and 1321 to close.

Assuming now for purposes of illustration that message material has been supplied to each of the storage repeaters shown in Figs. 8, 9 and 13, and that this message material is transmitted to these repeaters substantially simultaneously so that the contacts 821, 921 and 1321 are all closed substantially simultaneously. The closure of contacts 821 completes a circuit for the operation of relay 710 from battery through the winding of relay 710, the second set of normal contacts from the top of relays 610 and 619 to ground through the operated contact 821. Likewise closure contact 921 completes a circuit for the operation of relay 719 due to the current flowing through a similar circuit to ground through the closed contact 921. It is assumed that relays 619, 610 and 611 are all normal or released at this time. In other words, none of the stop keys associated with the transmitting portions of the storage repeaters shown in Figs. 8 and 9 have been operated and also that the transmitter start circuit 310 is not in the progress of transmitting a series of start signals or patterns, or starting transmission from any of the stations of the party line.

If the transmitter start circuit is in the progress of transmitting signals to cause the testing of any of the transmitters for storage message material available for transmission, relay 619 will be operated, which relay interrupts the operating circuit of relays 710 and 719. These relays will not, therefore, operate at this time but will wait until relay 619 is released at the end of the transmission of the transmitter start circuit by the transmitter start circuit 310.

If either of the stop keys has been operated, either relay 610 or 611 will be operated and will prevent the operation of the corresponding relay 710 or 719. Assuming, however, that both relays 710 and 719 operate at this time, the operation of relay 710 completes the circuit for the operation of relay 713 from battery through the winding of relay 713, through the lower inner break contacts of relay 607, the lower operated contacts of relay 710 and the lower break contacts of relay 715 to ground through the second set of normal contacts from the bottom of relay 609 and the break contacts of relay 602.

The operation of relay 719 completes a similar circuit for the operation of relay 722 from battery through the winding of relay 722, the upper inner break contacts of relay 607, the lower outer operated contacts of relay 719, and the lower break contacts of relay 724 to ground through the third set of normal contacts from the top of relay 609 and the break contacts of relay 603. The operation of either or both relays 713 and 722 completes a circuit for the operation of relay 607 from battery through the winding of relay 607 to ground, through the upper outer operated contacts of either or both relays 713 and 722. Relay 607 in operating interrupts the operating circuits of relays 713 and 722. However, the operation of relay 607 first completes a circuit for maintaining relay 713 operated from battery through the winding and the upper operated contacts of relay 713, the second set of operated contacts from the top and bottom of relay 607 to ground through the break contacts of relay 602.

Inasmuch as both relays 713 and 722 have been operated, relay 713 will lock operated while relay 722 will release due to the fact that both its operating circuit and locking circuit are interrupted. The operating circuit of relay 722 is interrupted by the operation of relay 607 and its locking circuit is interrupted by the operation of relay 713.

The release of relay 722 completes the circuit for the operation of relay 606 which relay in operating prepares a circuit for the operation of relay 612.

Similarly, the operation of relay 1204 in response to the operation of contacts 1321 prepares a circuit for the operation of relay 1201. Relays 1201 and 612 however do not both operate at this time.

Relay 612 does not operate because its operating circuit is interrupted at the lower operated contacts of relay 1204. Relay 1201, however, operates at this time in a circuit extending from battery through the winding of relay 1201, the upper operated contacts of relay 1209, the lower outer break contacts of relays 613 and 612, the upper break contacts of relay 1207 to ground through the operated contacts of relay 1204. Relay 1201 in operating completes a circuit for maintaining itself operated under control of relay 1209 in a circuit from battery through the winding and upper inner operated contacts of relay 1201 to ground through the lower operated contacts of relay 1209. Relay 1201 in operating removes the short circuit from around the code contacts of the distributor shown in Fig. 13 thus permitting these contacts to transmit codes stored in tape 1330. Relay 1201 in operating also completes a circuit for the operation of magnet 1311 in a circuit extending from battery through the winding of relay 1311, lower break contacts of relays 1210 and 1206, the fourth set of operated contacts from the top of relay 1201, the lower break contacts of relays 1211 and 1212 to ground through the closed contacts 1321.

Magnet 1311 attracts its armature and releases the sensing and transfer portion of the transmitter shown in Fig. 13. This mechanism in turn causes the transmitting distributor cam shaft controlled by magnet 1347 to be released at a short interval of time later after the members 1309 have positioned the contacts controlled by them in accordance with the perforations in tape 1330. Thereafter the signals stored in tape 1330 are transmitted over the receiving channel 211 of party line 210 in a normal manner. Under the conditions assumed above the letter J or K will precede the message. When the letter J or K which precedes the message is received by control equipment at each of the respective control centers 213, 214 and 215, these control centers will respond to this character and cause the transmission circuit to be selectively extended from the receiving channel 211 to the receiving instrument 229 at station 219.

As will be readily understood by those skilled in the art, if a different address signal had preceded the message it would usually but not necessarily be directed to a different receiving instrument. Thereafter, the receiving instrument to which this message is directed will receive and record the succeeding message signals. However, under the assumed conditions only those messages directed to preferred stations will be transmitted to the storage equipment in Fig. 13 as pointed out above and consequently the messages transmitted from this storage equipment by means of the associated transmitter will be transmitted to only the preferred stations.

During the transmission of the message all the usual code combinations may be transmitted in a normal manner over the outgoing channel which extends to the connected receiving instrument. None of the switching circuits will respond to any of these signals excepting the figures signals. When the figures signal is transmitted over the outgoing channel a circuit is completed for the operation of relay 1208 from battery through the upper winding of relay 1208, conductor 1334 to ground through the contacts controlled by members 1309 when they are positioned in accordance with the figures signal. If the succeeding signal combination is any code combination other than that representing another figures or H signal, relay 1208 will release when the members 1309 position the contacts controlled by them in accordance with any code combination other than the code combinations representing the figures signals or H signal. Thereafter circuits are maintained in the condition described above until the figures signal is immediately followed by an H signal.

During the transmission of the figures signal members 1309 are positioned in accordance with the figures signal and complete a circuit for the operation of relay 1208 as described above. When the immediately following signal is an H signal, members 1309 will be positioned in accordance with the H signal immediately after they have been positioned in accordance with the figures signal. Under these conditions a circuit will be completed for holding relay 1208 operated and for the operation of relay 1205. These circuits extend from battery through the winding of relay 1205 and the upper operated contacts of relay 1208 and from battery through the lower winding of relay 1208 and then in parallel through the lower operated contacts of relays 1208 and 1201 over lead 1335 to ground to the contacts controlled by members 1309 when these members are positioned in accordance with a code combination representing the letter H. Relay 1205 in operating completes a circuit for maintaining itself and relay 1208 operated under control of relay 1201. The circuit for maintaining these relays operated extends from ground through the lower inner operated contacts of relay 1201 and the upper operated contacts of relay 1205 to battery through the winding of relay 1205 and also through the upper operated contacts and lower winding of relay 1208 to battery. During the sensing and transferring of the next code combination stored in tape 1330, contacts 1317 will momentarily close and complete a circuit for the operation of relay 1206.

Contacts 1317 momentarily close during the transmission of each character by the transmitter associated with the storage equipment shown in Fig. 13. However, the circuit from these contacts is not completed except in the case of a figures signal and an H signal being transmitted immediately preceding the transmission of the code combination in question.

While the code combination following the figures signal and the H signal will normally be a letters signal, it does not necessarily have to be this code combination but may be any other suitable code combination.

The closing contacts 1317 complete a circuit for the operation of relay 1206 from battery through the winding of relay 1206 and the lower operated contacts of relay 1205 to ground through the operated contacts of relay 1317.

The operation of relay 1206 interrupts the operating circuit magnet 1311 and thus permits this magnet to release and stop the transmitting portion of the storing equipment shown in Fig. 13 at the end of the transmission of the code combination immediately following the figures and H code combinations as described above. The operation of relay 1206 also completes a circuit for maintaining itself operated under the control of relay 1201 from battery through the winding and upper inner operated contacts of relay 1206 to ground through the lower inner operated contacts of relay 1201. The operation of relay 1206 also interrupts the operating circuit of relay 1209, thus permitting relay 1209 to release. Relay 1209, however, is slow in releasing and does not release until after the third code combination referred to above has been fully transmitted.

After ample time has been provided for the complete transmission of this code combination, relay 1209 will release and interrupt both the operating and locking circuits of relay 1201. Relay 1201 will release and short-circuit the transmitting or code combination contacts which prevents further transmission at this time.

Assuming that at least a portion of a second message is awaiting transmission from tape 1330. Under these conditions, contacts 1320 will not open so relay 1204 will remain operated. Relay 1204 in remaining operated prevents the operation of relay 612 as described above. Under these conditions, relay 1201 will again operate upon release of relay 1209 in a circuit described above.

The operation of relay 1201 again conditions the equipment for transmitting the succeeding message stored in tape 1330. This message is transmitted over the party line 210 extending to the receiving instrument designated by the codes preceding the subject-matter of the message.

The circuits respond during the transmission of this message and to the address code preceding this message in the same manner as described above. If at any time it is desired to transmit transmitter start signals from the transmitter start circuit 310 over the receiving channel 211 of the party line 210, as described in the above-identified application of Branson et al., relay 1211 will be operated and interrupt the operating circuit of magnet 1311 thus interrupting the transmission from the transmitting equipment shown in Fig. 13 at the end of the code combination in the progress of being transmitted. At the completion of the transmission of the transmitter start signals, relay 1211 will be released and the transmission of the message stored in tape 1330 will be resumed.

During the operation of the transmitter start circuit, under the assumed conditions, the last one of the transmitters shown in Figs. 8 and 9 which previously transmitted over the receiving channel 311 of party line 210 will be employed for the transmission of the signals from the transmitter start circuit in a manner similar to that described in the above application of Branson et al.

Under certain circumstances it may be desirable to prevent the operation of the transmitter start circuit 310 during the transmission of urgent messages over the receiving channel of party line 210 or during the time that urgent messages are awaiting transmission over the receiving channel 211. In order to prevent the operation of the transmitter start circuit 310 at this time, key 1340 has been provided. When key 1340 is operated and relay 1204 also is operated due to the presence of storage material in tape 1330 available for transmission over party line 210, ground will be connected to a lead extending to the transmitter start circuit 310. Ground is also connected to the same lead to transmitter start circuit by incoming line circuit 322 and thus indicating a busy condition of the incoming line circuit and preventing the operation of the transmitter start circuit 310 at this time. Thus, with key 1340 closed and relay 1204 operated, the transmitter start circuit 310 will not be set into operation by the incoming line circuit at the end of the transmission from the transmitter then in the progress of transmitting a message from any one of the transmitters associated with the party line to the central switching station.

Assume now that the transmitting equipment shown in Fig. 13 is approaching the end of the last message stored in tape 1330. The transmitting head 1307 rotates in a clockwise direction at this time and causes the transmission of the first figures signal, which signal causes the operation of relay 1208 as described above. The transmission equipment shown in Fig. 13 will then cause the transmission of the following H signal which signal causes relay 1205 to operate and maintains relay 1208 operated. Relay 1205, when operated, completes a circuit for maintaining itself and relay 1208 operated under control of relay 1201.

The transmitting equipment shown in Fig. 13 will then start to transmit the following letters signals. During the first portion of the revolution of the transfer shaft and mechanisms, transmitting head 1307 will advance and come in contact with the recording or punching portion of the storing equipment since this will be the last signal stored in tape 1339 under the assumed conditions. At this time contacts 1321 open and interrupt the circuit of relay 1204 and also of magnet 1311. Relay 1204 releases at this time. The operating circuit of relay 612, however, is not completed because it is open at the third set of operated contacts from the top of relay 1201, which relay is still operated.

At about the time or a little after contacts 1321 open, contacts 1317 will close and complete a circuit for the operation of relay 1206. Relay 1206 in operating also interrupts the operating circuit of magnet 1311. Relay 1206 in operating completes a circuit for maintaining itself operated under control of relay 1201. Relay 1206 in operating also interrupts the operating circuit of the slow release relay 1209. After ample time has been provided for the complete transmission of the letters signal, as described above, relay 1209 will release and interrupt both the locking and operating circuits of relay 1201 and thus permit relay 1201 to release. The release of relay 1201 will interrupt the locking circuits of relays 1205, 1206 and 1208 and permit these relays to release. The release of relay 1206 again completes the operating circuit of relay 1209, which relay in turn reoperates. However, since no tape is available for transmission by the storage equipment shown in Fig. 13, relay 1204 will be released; consequently relay 1201 will not reoperate at this time.

The end-of-message signal pattern comprising a figures signal, an H signal and a letters signal is then transmitted over the receiving channel 211 of party line 210, as described above. When these signals are transmitted over the party line they cause the previously connected receiving equipment to be disconnected therefrom and all of the switching equipment at the secondary switching centers 213, 214 and 215 to be conditioned to respond to the address codes preceding the next message transmitted over the system.

Under the assumed conditions, when no messages or portions of messages await transmission from the urgent or preferred storage equipment shown in Fig. 13, but messages await transmission from the storage equipments shown in Figs. 8 and 9, the release of relay 1201, as described above, completes a circuit for the operation of relay 612 from battery through the winding of relay 612, the lower operated contacts of relay 713, the upper operated contacts of relays 607 and 606, the third set of normal contacts from the top of relay 1201 and the break contacts of relay 1204 to ground.

Relay 612 in operating interrupts the operating circuit of relay 1201 and thus prevents relay 1201 from operating during the time relay 612 is operated should a supply of stored message material become available for transmission from the storage equipment shown in Fig. 13 during the transmission of a message by the transmitter shown in Fig. 8.

Relay 612 in operating completes a circuit for maintaining itself operated under control of relay 717 in a circuit extending from battery through the winding and third set of operated contacts from the top of relay 612 to ground through the operated contacts of relay 717.

Relay 612 in operating completes a circuit for the operation of relay 609 from battery through the winding of relay 609, the upper outer break contacts of relays 610 and 611 to ground through the upper inner operated contacts of relay 612. Relay 609 in operating completes a circuit for maintaining itself operated from battery through its winding, the upper outer break contacts of relays 610 and 611, the lower operated contact of relay 609 to ground through the second set of upper normal contacts of relay 613. Relay 609 in operating transfers certain control connections so that the transmitter start circuit will employ the transmitting equipment in Fig. 8 should it be operated during the time relay 609 is operated. The operation of relay 609 also transfers other control circuits so that after the message under consideration is fully transmitted from the apparatus shown in Fig. 8, as will be described hereinafter, the apparatus shown in Fig. 9 will be given the first opportunity to transmit a message, if any is available for transmission, before the apparatus in Fig. 8 is given an opportunity to transmit a second message.

Relay 612 in operating completes a circuit for the operation of relay 602 from battery through the winding of relay 602 to ground, through the third set of operated contacts from the bottom of relay 612. The operation of relay 602 completes an obvious circuit for the operation of relay 603 and relay 603 completes a circuit through the armature of relay 604 to busy lamp 605, thus causing the busy lamp to flash during the transmission of signals.

The operation of relay 602 as described above interrupts the locking circuit of relay 713 and thus permits relay 713 to release. The release of relay 713 interrupts the operating circuit of relay 607 which relay releases and in turn releases relay 606.

The operation of relay 612 removes the short-circuit from around the code contacts of the storage apparatus shown in Fig. 8 and thus permits these contacts to transmit signals over the party line in the normal and well understood manner as described in greater detail in the above-identified application of Branson et al.

The operation of relay 612 as described above also completes a circuit for the operation of the control magnet 811 from battery through the winding of magnet 811, the break contacts of relay 718, the upper break contacts of relay 712, the second set of operated contacts from the top of relay 612, the second set of normal contacts from the top of relays 610 and 619 to ground through the closed contacts 821.

Magnet 811 in operating releases the transmitting equipment shown in Fig. 8 for transmission of the stored signals over the receiving channel 211 of party line 210. Thereupon the signals stored in tape 830 will be transmitted over the party line. The first signal transmitted will be an address code and the switching equipment associated with the party line will cause the corresponding receiving instrument to be operatively associated with the line. Thereafter this receiving instrument will receive the message and record the same.

The operation of the storage equipment in Fig. 8, particularly the transmission portion thereof, operates in substantially the same manner during the transmission of a message as is described above with reference to the equipment shown in Fig. 13. In addition, if the transmitter start circuit 310 is set into operation during this time, relay 619 as well as relay 714, will be operated and interrupt the transmission of the message stored in tape 830 and cause a portion of the transmitting equipment shown in Fig. 8 to transmit transmitter start signals. At the end of the transmission of the transmitter start signals, relays 619 and 714 will be released and transmission of the message stored in tape 830 will be resumed. The operation of the transmitter start circuit in cooperation with the various circuits is more fully described in the above-identified copending application of Branson et al.

At the end of the message stored in tape 830 a figures signal will be transmitted over the receiving channel 211 and this signal will be followed by an H signal and the H signal in turn followed by a letters signal. The transmission of these signals over the receiving channel of the party line causes the connected receiving equipment to be disassociated from the receiving channel and all of the switching equipment at the various control centers or secondary switching centers to be conditioned to respond to the address signals preceding the next message transmitted over channel 211.

Upon the transmission of the figures signal following the message, a circuit is completed for the operation of relay 711 from battery through the upper winding of relay 711 to ground through the contacts controlled by members 809, when these members are positioned in accordance with the figures signal. Assuming that the succeeding signal is the H signal, the positioning of members 809 in accordance with this signal will complete a circuit for maintaining relay 711 operated and for the operation of relay 716. These circuits may be traced from battery through the winding of relay 716 and the upper contact of relay 711 and also from battery through the lower winding of relay 711 and then in parallel through the lower operated contacts of relay 711, the second set of operated contacts from the bottom of relay 612 to ground through the contacts controlled by members 809. The operation of relay 716 completes a circuit for maintaining both itself and relay 711 operated under control of relay 612. Holding circuits for these relays extend from battery through the lower winding of relay 711, the upper operated contacts of relay 711 and also from battery through the winding of relay 716 and then in parallel through the upper operated contacts of relay 716 to ground through the lower inner operated contacts of relay 612. During the sensing of the letters signal following the H signal, contacts 817 will momentarily close. Furthermore, if there are no more messages or portions of messages stored in the tape 830, contacts 821 will be opened at this time. If, however, additional messages are awaiting transmission from the transmitting apparatus shown in Fig. 8, contacts 821 will not open. Assume for purposes of illustration that another message is awaiting transmission from this equipment. Under these circumstances, contacts 821 will not open. However, the closure of contacts 817 completes a circuit for the operation of relay 712 from battery through the winding of relay 712, lower operated contacts of relay 716 to ground through the closed contacts 817. Relay 712 in operating completes a circuit for maintaining itself operated from battery through its winding and upper inner operated contacts to ground through the lower inner operated contacts of relay 612.

The operation of relay 712 also interrupts the circuit of magnet 811 and thus stops the transmitter at the end of the transmission of the letters signal. The operation of relay 712 also interrupts a circuit of relay 717. Relay 717 is slow in releasing so that ample time is provided for the complete transmission of the letters signal over channel 211 before relay 717 releases. Upon the release of relay 717 the locking circuit of relay 612 is interrupted whereupon relay 612 releases. Release of relay 612 short-circuits the transmitting contacts of the transmitting apparatus shown in Fig. 8 and in addition interrupts the locking circuits of relays 711, 712 and 716 thus permitting these relays to release. The release of relay 712 reestablishes the operating circuit of relay 717 which relay then reoperates.

Release of relay 612 interrupts the operating circuit of relay 602 which relay releases after a short interval of time, during which ample time is provided for the release of relays 711, 712 and 716 as described above, and in releasing interrupts the operating circuit of relay 603. Relay 603 is a slow release relay and does not release until ample time has been provided for the operation of relays 722 and 607 as described hereinafter.

Under the assumed conditions of a message awaiting transmission from the equipment shown in Fig. 9, the release of relay 602 completes a circuit for the operation of relay 722 from battery through the winding of relay 722 through the upper inner break contacts of relay 607, the lower operated contacts of relay 719, the lower break contacts of relay 724 through the second set of operated contacts from the bottom of relay 609 to ground through the break contacts of relay 602. The operation of relay 722 completes a circuit for the operation of relay 607 from battery through the winding of relay 607 to ground through the upper outer operated contacts of relay 722. Relay 607 in operating completes a locking circuit for maintaining relay 722 operated from battery through the winding of relay 722 and its upper inner operated contacts, the upper inner break contacts of relay 713, the middle set of upper and lower contacts of relay 706 to ground through the break contacts of relay 602. The operation of relay 607 interrupts the operating circuit of relay 713 before relay 603 releases and thus prevents the operation of relay 713 at this time. The operation of relay 607 completes a circuit for the operation of relay 606 described above.

If no message had been awaiting transmission from the storage equipment shown in Fig. 9 then relay 719 would not be operated and consequently relay 722 would not operate upon the release of relay 602. If additional messages were still awaiting transmission from the equipment shown in Fig. 8 at this time then upon the release of relay 603 a circuit would have been completed for the operation of relay 713 and the circuits operated thereafter in the same manner as described above.

If during the time the message was in the progress of transmission from the storage equipment shown in Fig. 8, a message or a portion of a message was stored by the equipment shown in Fig. 13, contacts 1321 will close and complete a circuit for the operation of relay 1204. Then upon the release of relay 612, relay 1201 will operate and the circuits shown in Figs. 12 and 13 operate as described above and cause the transmission of all the messages stored in tape 1330. If no additional messages were stored in tape 1330 during the transmission of a message from the equipment shown in Fig. 8 or upon the completion of all the messages available for transmission from the equipment shown in Fig. 13, the circuits will operate in the following manner.

Upon the operation of relay 606 and the release of relays 1204 and 1201 a circuit will be completed for the operation of relay 613. The operation of relay 613 conditions the equipment shown in Fig. 9 for transmission of a message stored in the tape 930 in a manner similar to the manner in which the operation of relay 612 causes the transmission of a message from the equipment shown in Fig. 8. The message from the equipment shown in Fig. 9 will then be transmitted over the receiving channel 211 of party line 210. This message will be preceded by an address code designating the receiving equipment by which the message will be recorded or received. The switching equipment associated with party line 210 will respond to these address signals and cause a message to be received by the designated receiving equipment. At the end of the message, a message signal pattern will cause this equipment to be disassociated from the party line 210. The end-of-message signal pattern will also cause the transmitting equipment shown in Fig. 9 to be disassociated from the receiving channel 211 and permit a message recorded in either tape 1330 or 811 to be transmitted if such a message is present in these tapes. As described above, if messages are stored in tape 1330, these messages will be transmitted prior to the transmission of messages from either tapes 830 or 930. However, when no messages are available for transmission from tape 1330, messages will be transmitted alternately from tapes 830 and 930. If messages are available for transmission from only one of these tapes, all of the messages available for transmission therefrom will be transmitted one after the other provided, of course, no messages are received in the meantime by the storage repeater shown in Fig. 13. It is thus evident that the messages recorded in tape 1330 are given preference on a message basis over the messages stored in tapes 830 and 930. That is, at the end of each message in the progress of transmission over the system, an opportunity is provided for transmission of any message material stored in tape 1330. It should be noted, however, that the transmission of any message over the system is not interrupted for the transmission of urgent messages from the message equipment shown in Fig. 13. Instead, messages in the progress of transmission from either the equipment shown in Fig. 8 or Fig. 9 are completely transmitted before the messages stored in tape 1330 are transmitted. However, only the message in the progress of transmission is completed and other messages stored in tapes 830 and 930 are not transmitted so long as any messages are awaiting transmission from tape 1330.

Various indicating alarm and control features similar to those described in the above-identified application of Branson et al. are also provided to facilitate the maintenance of the equipment and location of troubles and improper operation. Inasmuch as these features operate in substantially the same manner as described in the above-identified Branson et al. application, detailed description thereof is not repeated at this point since the above-identified application is incorporated herein.

In the foregoing description of a typical embodiment of the present invention, it was assumed that messages directed to certain stations would be given preference over messages directed to other stations. It will also be apparent to those skilled in the art that ordinary or non-preferred messages may also be transmitted to the designated stations by assigning a second address code to these stations which address code will cause a message to be transmitted to the storage repeaters shown in Fig. 8 or Fig. 9. Thus, by assigning two address codes to one or more of the stations of any of the party lines or of the entire system set forth herein, it is possible to transmit two different classes of messages, one more urgent than the other. It will also be evident to those skilled in the art that by assigning three or more codes to any or all of the stations, messages of still different classes may be transmitted to any of the respective stations, the only requirement being that a separate address code be provided for each different class of message directed to each of the respective stations or receiving equipment at any or all of the stations. For example, in the specific system shown, by slightly rearranging the connections in the director circuit as described in the above-identified application of Branson et al., messages preceded by the address code BJ and directed to the receiving equipment 229 may be given a preference over all other messages transmitted over the party line or may be given preference over messages transmitted to non-preferred receiving conditions or equipment, while messages preceded by the address code BK will be directed through the storage repeater shown in Figs. 8 and 9 and will be transmitted to the receiving equipment 229 in their regular turn along with other regular or non-preferred messages.

It is thus evident that a flexible preference arrangement is provided in accordance with the present invention which will meet a number of different traffic conditions and provide a large number of different classes of service, which conditions are frequently encountered in giving service over networks and systems of this type.

What is claimed is:

1. A teletypewriter system in which messages are directed to their destinations by address codes associated with each message comprising one outgoing line, switching apparatus at a central office, a plurality of sets of one or more storage transmitters individual to said line, means controlled by address codes for directing preferred messages through said switching apparatus to one of said sets of transmitters, and other means whereby such transmitters transmit all messages in their storage over said line prior to transmission of messages from other transmitters individual to said line.

2. A system comprising a transmission line, a plurality of transmitters individual to said line each controlled by storage means wherein messages for transmission are stored, selective means for directing certain message signals selectively to the storage means of any of said transmitters, control means for assigning turns of transmission to said transmitters, and elements included in said control means for preventing the assigning of any turns of transmission to one or more of said transmitters when other of said transmitters are supplied with stored signals.

3. A telegraph system comprising a plurality of telegraph stations which are assigned address codes, a telegraphic signal transmission channel extending to said stations, switching apparatus connected to said channel responsive to address codes for operatively associating the corresponding receiving device with said channel, a first storage controlled transmitter for transmitting over said channel address codes and messages for certain of said stations, other storage transmitters for transmitting over said channel address codes and messages for other of said stations, control apparatus for causing transmission of all messages available for transmission from said first transmitter before causing transmission from said other transmitter, and other selective switching apparatus responsive to address codes for selectively directing messages to said storage controlled transmitters.

4. A system comprising an outgoing channel of transmission, a plurality of impulse transmitters individual thereto for transmitting thereover one at a time, storage means for each of said transmitters, selective means for selectively directing to one or another of said storage means a group of message codes constituting a message, control means for assigning turns of transmission to said transmitters with the transmission of a complete message upon each turn, and means in said control means for assigning all the turns of transmission to one transmitter as long as said transmitter has stored message codes available for transmission.

5. A plurality of transmitters each individual to an outgoing channel of transmission for transmitting thereover one at a time, storage means for controlling the transmission of said transmitters, means for selectively directing to said storage means groups of code characters comprising a message each followed by one or more of the code characters constituting an end-of-message indication, means operable by passage through said transmitter of the end-of-message code group of the last message available for transmission to terminate transmission from said transmitter, and means for testing another transmitter for transmissible material in combination with means for preventing the testing of any other of said transmitters as long as a predetermined one of said transmitters has stored groups of code characters available for transmission.

6. A system comprising a plurality of storage controlled telegraph transmitters individual to an outgoing channel of transmission for transmitting thereover one at a time, automatically operating switching means for selectively directing to one or another of said transmitters messages each comprising message code combinations followed by an end-of-message code pattern, control means for said transmitters responsive to end-of-message code patterns and to the presence of storage signals available for transmission for initiating transmission therefrom in combination with apparatus operable by the presence of storage signals available for transmission from one of said transmitters for preventing the initiation of transmission from any other of said transmitters.

7. In a telegraph system, a plurality of transmitters each controlled by a message inscribed tape, a channel of transmission outgoing from said transmitters, control means interrelating said transmitters whereby upon cessation of transmission from any one thereof, a particular one thereof transmits in preference to all the others so long as it is supplied with transmissible message material inscribed in its tape, in combination with a source of signals, including directing signals, apparatus responsive to message and directing code signals for causing the inscription of said signals upon one or another of said tapes, and selective means responsive to said directing code signals to select the particular tape for inscription of the message.

8. In a telegraph system, a plurality of transmitters each controlled by a message inscribed tape, a single channel of transmission outgoing from all of said transmitters, control means interrelating said transmitters whereby upon cessation of transmission from any one thereof a particular one thereof transmits in preference to all the others so long as it is supplied with transmissible message material in its tape, in combination with a source of signals including directing codes for inscribing said tapes, automatically operating apparatus responsive to predetermined directing codes for selectively causing the inscription upon the tape of said particular transmitter all preferred messages for transmission over said channel.

WALTER M. BACON.